Nov. 30, 1965  R. D. SIMONTON  3,220,886
RESILIENTLY JACKETED BATTERY ASSEMBLY
Filed April 4, 1962
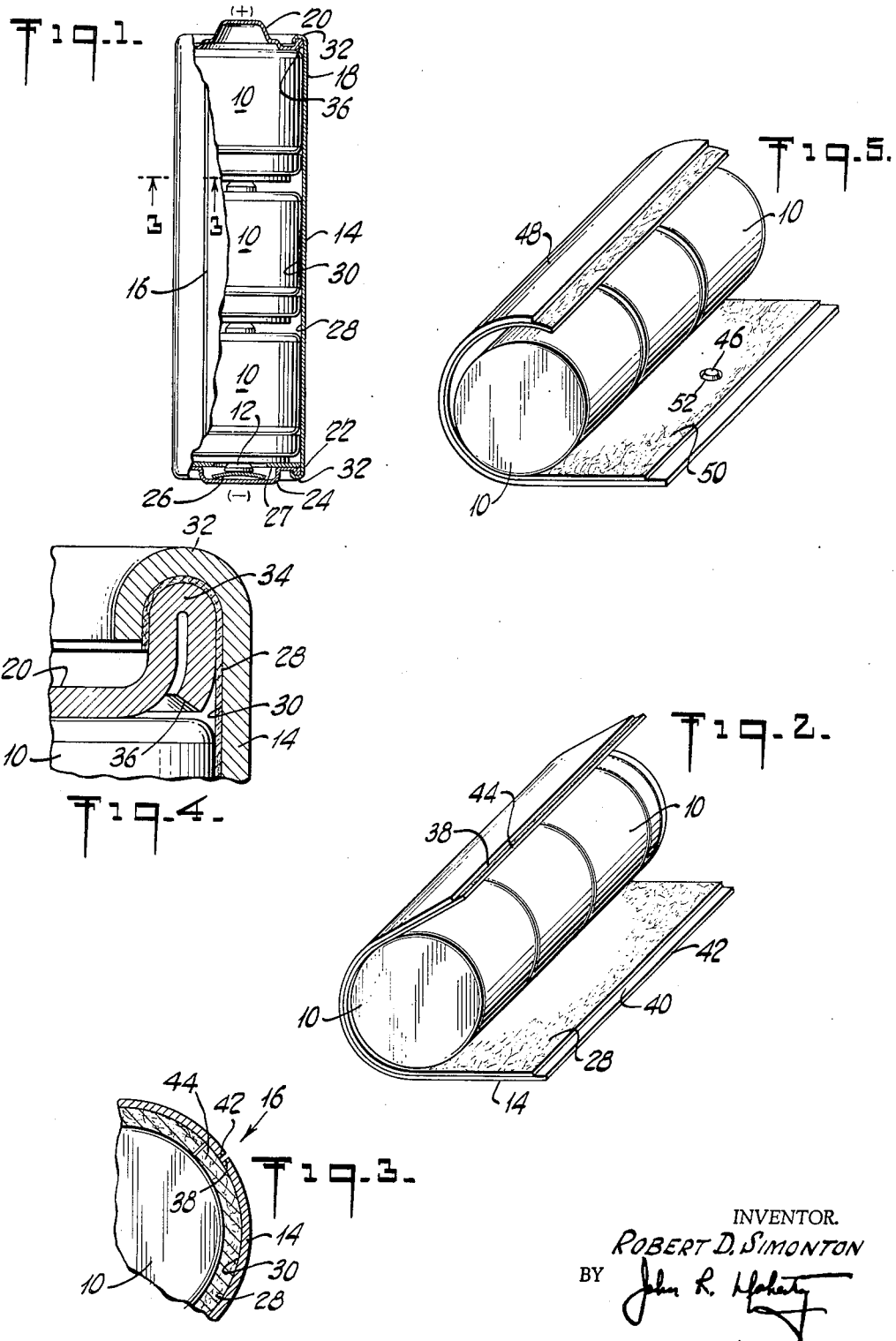
INVENTOR.
ROBERT D. SIMONTON
BY
ATTORNEY 3,220,886
RESILIENTLY JACKETED BATTERY ASSEMBLY
Robert D. Simonton, Bay Village, Ohio, assignor to Union
Carbide Corporation, a corporation of New York
Filed Apr. 4, 1962, Ser. No. 184,969
7 Claims. (Cl. 136—132)

This invention relates to battery assemblies, and more particularly, it relates to a battery having a novel wrapper or jacket which offers marked economies in production and provides improved volumetric efficiency.

The principal object of the invention is to provide an economically packaged battery assembly.

Another object is to provide a battery assembly exhibiting improved volumetric efficiency.

Yet another object is to provide an adjustment in the battery assembly to accommodate the tolerance variation in cell diameters of the battery cells.

A further object is to provide packaged battery assemblies which can withstand abusive handling and which are particularly well adapted for manual or mechanized production.

Yet a further object is to provide a battery assembly having means for providing a variable voltage.

The objects are achieved by the invention which comprises a battery assembly comprising a plurality of cells stacked end to end in a single column and held in axial alignment with each other by the resiliency of a slit cylindrical jacket. The resiliency of the jacket is achieved by forming the jacket from a flat blank into a slit tube smaller in diameter than that of the cells which are inserted therein.

The principles of the invention will be described with reference to the drawing in which:

FIGURE 1 is a vertical partially sectioned view of a battery assembly utilizing the principles of the invention;

FIGURE 2 is a perspective view of parts of the battery of FIGURE 1, showing details of the construction;

FIGURE 3 is an enlarged fragmentary detailed sectional view taken along plane 3—3 of FIGURE 1;

FIGURE 4 is an enlarged fragmentary detailed view of the end terminal closure of the battery; and FIGURE 5 is a perspective view of a modification of the battery assembly shown in FIGURES 1 and 2.

Referring now to the drawing, and particularly to FIGURES 1, 2, 3 and 4, there is shown one form of the invention. A plurality of cells 10, suitably alkaline cells and having negative electrodes 12, are encased within a jacket 14 having a longitudinal slit or gap 16. The upper end 18 of the jacket 14 is suitably closed with a positive terminal cover 20 and the lower end 22 is suitably closed with a negative terminal cover 24. A resilient conductive member or contact spring 26 is preferably located between the negative electrode 12 of an adjacent cell 10 and the negative terminal cover 24. An insulating washer 27 is positioned between the same cell 10 and the negative terminal cover 24.

As best shown in FIGURES 3 and 4, an insulator 28 is suitably provided between the inside wall 30 of the jacket 14 and the cells 10. The ends 18 and 22 of the jacket 14 are curled over the end terminal covers 20 and 24 as at 32 in FIGURE 4. The peripheral portion 34 of each end terminal cover 20 and 24 is preferably bent back on itself 180 degrees in the form of an inverted U so that no sharp rim or edge is in contact with the insulator 28 and precludes the raw edge 36 from cutting through the insulator 28 and shorting out the battery.

In the fabrication of a battery in accordance with the invention, the jacket 14 is cut to size from sheet material, suitably steel, copper, aluminum or their alloys. The jacket 14 is formed into a tubular shape by any of numerous manufacturing methods such as by forcing it against a rubber covered roller or mandrel. The original jacket inside diameter for a particular battery of cells should be smaller than the outside diameter of the individual cells. This is suitably accomplished by permitting the jacket edges to overlap after forming.

Prior to forming the jacket 14, the insulator 28 is suitably laminated thereon by an adhesive or by heatsealing in such a manner that it juts out beyond an edge 38 by a small amount. The insulator 28 it will be noted, does not cover the entire inner surface area of the jacket 14 and a strip 40 of the jacket 14 is left exposed on an opposite edge 42 as best shown in FIGURE 2. The jutting or extending portion 44 of the insulator 28 conceals the cells 10 and the gap 16 between the opposite edges 38 and 42 of the jacket 14 as best shown in FIGURE 3. By using a colored insulator 28 and longitudinal color bands of the same color on the outside surface of the jacket 14 alongside the opposite edges 38 and 42 the gap 16 is rendered practically imperceptible.

During the assembly of a battery of the invention, the jacket 14 must be sprung open so that the cells 10 may be readily inserted. Once the cells 10, spring 26, insulating washer 27 and covers 20 and 24 are assembled into the jacket 14, the sprung jacket 14 is then released and thus springs back around the cells 10. The cells 10 which are larger in diameter than the original inside jacket diameter impart resiliency to the jacket 14 when they are stacked therein. Thus, the assembly inherently causes the jacket 14 to exert a radial force or pressure on the cells 10 which holds them in axial alignment.

FIGURE 5 illustrates a suitable modification of the battery of FIGURES 1 and 2 in that it is provided with an intermediate voltage tap 46 which causes a jacket 48 to become polarized when the cells 10 are stacked therein. The tap 46 is made to contact an appropriate intermediate cell 10 by virtue of the indentation in the surface of the jacket 48 and by a cut-away portion of an insulator 50 as at 52. Any desired voltage level within the limitations of the battery may be obtained by indenting the jacket in an appropriate position thus making it a third terminal of the battery.

The battery jacket can be composed of plastic unless it is to be subjected to high temperature conditions. For higher temperature environments or rugged usage the jacket is suitably composed of steel, aluminum, copper or their alloys.

It will be appreciated that other methods of applying an insulator to the battery jacket can be used in the manufacture of batteries of the invention. For example, the insulating material can be sprayed onto the jacket prior to forming it to a desired diameter. Another method is to provide an insulating wrapper around each individual cell of the battery, thereby eliminating the need to insulate the battery jacket itself. Regardless of the method used, all insulators must be non-conductive since they prevent the cells in the battery from being short-circuited and preclude the jacket from being polarized. It is also desirable for the insulating material to be somewhat absorbent. If minute creepage or caustic leakage occurs in any of the cells, the insulator would therefore readily absorb it before it proceeds to leak out of the battery jacket by way of the gap.

In prior battery constructions of the seamless or seamed tube container type, the diameter of the cells must be less than the diameter of the container so that the cells can be inserted therein. This creates an undesirable radial clearance (i.e., waste space) between the cells and the walls of the seamless container battery thus lowering its volumetric efficiency.

In contrast, the jacket of the invention must be sprung open by separating the overlapping parallel edges slightly thereby allowing sufficient radial clearance for assembling the stack of cells therein. The sprung jacket is released around the cells which are of a larger diameter than the original jacket inside diameter; thus sufficient resilience is imparted to the jacket thereby causing a radial force or pressure on the high diameter cells and a slightly lower pressure on the lower diameter cells. In the battery of the invention no radial clearance exists between the cells and the walls of the jacket and thus a higher volumetric efficiency is achieved.

The battery wrapper or jacket disclosed herein has a further advantage over an identical size battery container of a seamless or seamed tube-type construction in that the gap of the subject jacket can be adjusted. Thus, the opposite edges of the jacket can be adapted to be edge to edge or up to about .025 inch apart after forming. This adjustment feature provides greater latitude in the manufacturing tolerances particularly the diameters of the cells which are to be stacked in the sprung jacket and obviates the need for expensive gaging or special matched tolerance selection of cells which would be necessary when making a seamless or seamed tube-type battery.

It will also be appreciated that large production savings are achieved in fabricating the battery jacket of the invention. The sheet material from which the jackets are cut can be lithographed as large sheets prior to cutting and forming the jackets, whereas with formed tubing the printing must be done individually on a cylindrical surface for each battery container.

While the battery of the invention has been described herein as incorporating both a contact spring and end terminal covers, it will be understood that they are not altogether necessary. For example, in a single cell unit, neither the spring nor the end terminal covers are a necessity. Of course, with a single cell unit the decorative jacket can be made from a thinner sheet material and need not have as much resiliency as the multi-cell battery jacket.

However, it is preferable to use a spring in all other batteries of the invention since the spring exerts an axial force on the cell stack thus maintaining the cells in position and keeping good electrical contact between the electrodes of adjacent cells especially when the battery is subjected to very severe use such as vibrations, impact or shock and acceleration forces. When a spring is used in the battery of the invention, its spring rate must be such that it overcomes the frictional forces between the cells and the jacket and the radial pressures exerted on the walls of the cells by the resilient jacket otherwise the electrical contact between the electrodes of the cells could be interrupted.

It will be appreciated that many modifications of the battery construction disclosed herein can be made without departing from the spirit and scope of the invention; for example, the jacket may be utilized equally as well for protecting and decorating a long single cell.

What is claimed is:

1. A battery assembly comprising at least one cylindrical cell, a tubular jacket surrounding said cell and having a longitudinal disposed slit which imparts resiliency to said jacket, insulating means between said cell and said jacket, and at least one conductive end terminal closure member in contact with an electrode terminal of said cell comprising a disc-like cover having a flanged peripheral edge secured in place with the peripheral edge of said jacket; said jacket resiliently embracing said cell under a radial pressure sufficient to hold said cell in axial alignment with said jacket.

2. The battery of claim 1 wherein said tubular jacket is made of a metallic material.

3. A battery assembly comprising a stack of cylindrical galvanic cells, each having an electrode in contact with an electrode of an adjacent cell, a metallic tubular jacket provided with a longitudinal slit surrounding said cells and insulated therefrom, and at least one conductive end terminal closure member in contact with an end electrode terminal of said stack of cells comprising a disc-like cover having a flanged peripheral edge secured in place by a curled peripheral edge of said jacket; said jacket resiliently embracing said stack of cells under a radial pressure sufficient to hold said stack in axial alignment with said jacket.

4. The battery assembly of claim 2 wherein at least one resilient conductive member is interposed between said end terminal closure member and said end electrode terminal of said stack of cells.

5. A battery assembly comprising a stack of cylindrical galvanic cells, each having an electrode in contact with an electrode of an adjacent cell, a metallic tubular jacket surrounding said stack of cells, said jacket having an insulator circumferentially disposed about said stack of cells and having a longitudinal disposed slit, said slit having parallel edges spaced from each other a small distance sufficient to impart resiliency to said jacket, and at least one conductive end terminal closure member in contact with an end electrode terminal of said stack of cells comprising a disc-like cover having a flanged peripheral edge secured in place by a curled peripheral edge of said jacket; said jacket resiliently embracing said stack of cells under a radial pressure sufficient to hold said stack of cells in axial alignment with said jacket.

6. The battery assembly of claim 4 wherein at least one conductive spring is interposed between said end terminal closure member and said end electrode terminal of said stack of cells.

7. The battery assembly of claim 3 wherein an intermediate voltage tap is provided; said tap comprising an indentation on the surface of said tubular jacket which contacts the container of an intermediate cell of said stack of cells thereby polarizing said tubular jacket.

References Cited by the Examiner

UNITED STATES PATENTS

| | | | |
|---|---|---|---|
| 1,102,458 | 7/1914 | Utard et al. | 136—175 |
| 2,204,707 | 6/1940 | Seiss | 136—173 X |
| 2,307,767 | 1/1943 | Deibel | 136—111 |
| 2,632,784 | 3/1953 | Marsal et al. | 136—111.4 |
| 2,816,151 | 12/1957 | Ruben | 136—111 |
| 2,833,848 | 5/1958 | Marty | 136—111 |
| 2,864,880 | 12/1958 | Kaye | 136—111 |

WINSTON A. DOUGLAS, *Primary Examiner.*

JOHN H. MACK, *Examiner.*